(12) United States Patent     (10) Patent No.:   US 12,692,628 B2

Tankersley et al.     (45) Date of Patent:   *Jul. 28, 2026

(54) ASPIRATOR FOR MANIPULATING FILAMENTS

(71) Applicant: COLUMBIA INSURANCE COMPANY, Omaha, NE (US)

(72) Inventors: Adam Tankersley, Dalton, GA (US); Jesse Guzowski, Dalton, GA (US)

(73) Assignee: COLUMBIA INSURANCE COMPANY, Omaha, NE (US)

( * ) Notice: Subject to any disclaimer, the term of this patent is extended or adjusted under 35 U.S.C. 154(b) by 533 days.

This patent is subject to a terminal disclaimer.

(21) Appl. No.: 18/331,883

(22) Filed: Jun. 8, 2023

(65) Prior Publication Data

US 2023/0313414 A1     Oct. 5, 2023

Related U.S. Application Data

(63) Continuation of application No. 17/308,124, filed on May 5, 2021, now Pat. No. 11,708,648.

(Continued)

(51) Int. Cl.
    *D01D 5/00*     (2006.01)
    *B65H 51/16*     (2006.01)
    (Continued)

(52) U.S. Cl.
    CPC ............... *D01D 5/00* (2013.01); *B65H 51/16* (2013.01); *F16K 5/0407* (2013.01); *F16K 11/0853* (2013.01); *F16K 27/065* (2013.01)

(58) Field of Classification Search
    CPC ........ F16K 5/0407; F16K 5/04; F16K 5/0471; F16K 11/0853; F16K 11/085;
    (Continued)

(56) References Cited

U.S. PATENT DOCUMENTS 2,062,422 A * 12/1936 Meese ........................ F16K 1/42
            251/270
2,290,349 A * 7/1942 Ohls ..................... F16K 5/0471
            251/317

(Continued)

FOREIGN PATENT DOCUMENTS

| | | |
|---|---|---|
| DE | 198 51 957 C1 | 4/2000 |
| EP | 0 146 898 A2 | 7/1985 |
| GB | 2122309 A * | 1/1984 ............ F16K 11/085 |

OTHER PUBLICATIONS

NPL "The Properties and Advantages of PTFE PTFE is an Incredibly Versatile Material" by AFT Flurotec published on Jul. 19, 2016 (Year: 2016).*

(Continued)

*Primary Examiner* — David Colon-Morales

(74) *Attorney, Agent, or Firm* — Lathrop GPM LLP; Laura A. Labeots

(57) ABSTRACT

An aspirator provides linear control over air flow for manipulation of extruded fibers. A distribution manifold has a barrel valve between first and second flow channels, enabling precise, linear control over air flowing from a charge conduit to a pressure chamber surrounding a discharge pipe. Plural orifices in the discharge pipe connect the pressure chamber to the interior thereof, which is configured as a Venturi tube. Discharge pipe surfaces that can contact filaments therein are of hardened material while non-contact surfaces are of lighter materials.

19 Claims, 10 Drawing Sheets

Related U.S. Application Data

(60) Provisional application No. 63/020,509, filed on May 5, 2020.

(51) Int. Cl.
| | |
|---|---|
| *F16K 5/04* | (2006.01) |
| *F16K 11/085* | (2006.01) |
| *F16K 27/06* | (2006.01) |

(58) Field of Classification Search
CPC . F16K 27/065; D01D 5/00; D02J 1/08; B65H 51/16; D02G 1/16
See application file for complete search history.

(56) References Cited

U.S. PATENT DOCUMENTS

| | | | |
|---|---|---|---|
| 2,578,101 A | 12/1951 | Stalego | |
| 2,783,609 A | 3/1957 | Breen | |
| 2,852,906 A | 9/1958 | Breen | |
| 2,864,579 A * | 12/1958 | Stoltenberg | F16K 5/0278 251/368 |
| 2,884,756 A | 5/1959 | Head | |
| 2,911,784 A | 11/1959 | Vandervoort | |
| 2,943,838 A * | 7/1960 | Skei | F16K 5/0471 251/317 |
| 3,041,036 A * | 6/1962 | McFarland, Jr. | F16K 5/0471 251/315.11 |
| 3,108,779 A * | 10/1963 | Anderson | F16K 25/00 251/315.11 |
| 3,133,723 A * | 5/1964 | Goldman | F16K 5/0478 251/309 |
| 3,168,280 A * | 2/1965 | Mueller | F16K 5/0492 251/286 |
| 3,184,215 A * | 5/1965 | Anderson | F16K 5/0471 251/317 |
| 3,199,835 A * | 8/1965 | Freed | F16K 5/0471 251/317 |
| 3,241,234 A | 3/1966 | Kiefer et al. | |
| 3,314,644 A * | 4/1967 | Dwyer | F16K 27/065 251/309 |
| 3,331,671 A | 7/1967 | Goodwin | |
| 3,346,002 A * | 10/1967 | Thompson, Jr. | F16K 5/0471 29/890.128 |
| 3,383,088 A * | 5/1968 | Duffey | F16K 27/062 251/317 |
| 3,430,919 A * | 3/1969 | Frazier | F16K 39/06 251/312 |
| 3,536,295 A * | 10/1970 | Sinkler | F16K 5/0271 251/283 |
| 3,563,512 A * | 2/1971 | Hauffe | F16K 5/045 251/312 |
| 3,718,270 A | 2/1973 | Parmeggiani et al. | |
| 3,759,295 A * | 9/1973 | Dence | B60K 17/10 180/6.3 |
| 3,802,457 A * | 4/1974 | Wurzburger | F16K 31/5284 251/286 |
| 3,825,030 A * | 7/1974 | Kalsi | F16K 27/065 264/269 |
| 3,916,950 A * | 11/1975 | Mongerson | F16K 11/085 251/361 |
| 3,918,493 A * | 11/1975 | Tobias | F16K 11/072 137/625.23 |
| 4,010,930 A * | 3/1977 | Sands | F16K 5/0478 251/309 |
| 4,055,324 A * | 10/1977 | Hughes | F16K 5/04 251/317 |
| 4,193,580 A * | 3/1980 | Norris | F16K 5/0407 251/304 |
| 4,215,847 A * | 8/1980 | Hoos | F16K 5/0271 251/317 |
| 4,506,703 A * | 3/1985 | Baron | F28G 1/125 137/625.43 |
| 4,655,252 A * | 4/1987 | Krumhansl | F16K 11/0853 251/59 |
| 4,666,590 A * | 5/1987 | Sano | B65H 51/16 210/350 |
| 4,774,984 A * | 10/1988 | Peters | F16K 47/045 251/127 |
| 4,828,469 A | 5/1989 | Right | |
| 4,889,476 A | 12/1989 | Buehning | |
| 4,909,211 A * | 3/1990 | Cook | F02D 9/16 137/601.01 |
| 4,961,695 A | 10/1990 | Hirschmann et al. | |
| 5,326,009 A * | 7/1994 | Kobayashi | D04H 3/03 226/97.4 |
| 5,392,813 A * | 2/1995 | Smith | F16K 39/06 251/283 |
| 5,569,865 A | 10/1996 | Profé et al. | |
| 5,617,815 A * | 4/1997 | Spies | F16K 11/0853 123/41.1 |
| 5,746,072 A * | 5/1998 | Bohnke | B65H 20/14 34/640 |
| 5,857,606 A * | 1/1999 | Tseng | B65H 54/88 226/97.4 |
| 6,438,934 B1 | 8/2002 | Foster et al. | |
| 7,984,730 B2 * | 7/2011 | Ziv | F16K 27/065 137/239 |
| 9,874,283 B1 * | 1/2018 | Shih | F16K 27/065 |
| 9,897,223 B1 * | 2/2018 | Roberts | F16K 25/00 |
| 9,958,073 B2 * | 5/2018 | Yang | F16K 5/0407 |
| 10,724,645 B2 * | 7/2020 | Konaka | F16K 11/076 |
| 10,816,096 B2 * | 10/2020 | Eitzinger | F16K 5/12 |
| 11,708,648 B2 * | 7/2023 | Tankersley | F16K 27/00 28/271 |
| 11,788,631 B2 * | 10/2023 | Tankersley | F16K 5/0207 137/15.24 |
| 2002/0079003 A1 * | 6/2002 | Scampini | F16K 5/0407 137/625.32 |
| 2004/0244166 A1 | 12/2004 | Garzetti | |
| 2011/0277285 A1 | 11/2011 | Simmen et al. | |
| 2012/0042455 A1 | 2/2012 | Carnevale | |
| 2014/0302189 A1 | 10/2014 | Brandt | |
| 2017/0089473 A1 * | 3/2017 | Nowell | F16K 5/0471 |
| 2018/0142382 A1 | 5/2018 | Verma | |
| 2018/0149277 A1 * | 5/2018 | Hattan | F16K 21/00 |
| 2018/0347076 A1 | 12/2018 | Evenepoel et al. | |
| 2020/0240052 A1 | 7/2020 | Brandt | |
| 2020/0362487 A1 | 11/2020 | Mack et al. | |
| 2021/0285551 A1 | 9/2021 | Renollett et al. | |

OTHER PUBLICATIONS

NPL "A specifier's guide to choosing the right filled PTFE material" by Louise Davis published on Sep. 13, 2016 (Year: 2016).*

International Search Report and Written Opinion for International Application No. PCT/US21/30790 dated Aug. 11, 2021, 8 pages.

Precision Products Incorporated, High Speed Aspirator, https://www.ppiparts.com/product/95-025h/.

* cited by examiner

ASPIRATOR FOR MANIPULATING FILAMENTS

CROSS-REFERENCE TO RELATED APPLICATION

This application is a continuation of U.S. application Ser. No. 17/308,124, filed on May 5, 2021, which claims the benefit of priority U.S. Provisional Application No. 63/020,509, filed on May 5, 2020, the entireties of each are incorporated herein by reference.

BACKGROUND

The production of nonwoven webs of fibrous elements, such as polymer filaments requires the use of tools for manipulating the filaments without tangling them. For example, when polymer filaments are extruded from spinnerets, it is necessary to collect the cooled filaments and direct them to further processing equipment, including Godet rollers and winding spools. Aspirator guns have typically been used for this purpose.

However, known aspirator guns have suffered from non-linear control over the flow of air used to attract and draw extruded fibers, thus leading to unpredictable efforts at manipulating such fibers. This often leads to damaged fibers and wasted materials.

Most polymer filaments are very abrasive as they flow through aspirators at typical speeds. Some prior art aspirators use lightweight materials, such as aluminum for internal contact surfaces for weight savings despite a propensity for wear. Other prior art aspirators utilize hardened materials that are more resistant to wear, but are thus heavy and harder to manipulate precisely.

There exists a need for a durable, lightweight aspirator that enables optimized control over air flow for use in manipulating extruded fibers without damage.

BRIEF SUMMARY

The present disclosure describes an aspirator that provides linear, predictable control over air flow, thus leading to improved efficiency in the manipulation of extruded fibers or other particulate matter. A method of use of the disclosed aspirator is also disclosed.

In an embodiment, the aspirator includes an air distribution manifold having a first flow channel and a second flow channel. The first flow channel has an inlet in the air distribution manifold and is configured to be selectively coupled to a charge conduit providing pressurized fluid to the first flow channel. The second flow channel is adjacent to the first flow channel and has an inlet and an outlet in the air distribution manifold. The manifold also has a barrier wall intermediate the first and second flow channels.

A barrel valve assembly is disposed intermediate the first and second flow channels in the barrier wall. The configuration of a passage through the barrel valve enables linear adjustment to fluid communication between the first and second flow channels.

A charge conduit interface is received within the first flow channel. An inlet guide pipe, dimensioned to receive plural textile filaments therein, is disposed with respect to an upstream end of the manifold. A discharge pipe is partially disposed within the second flow channel. The second flow channel has a first portion at an upstream end. The first portion of the second flow channel is configured for selective engagement with the inlet guide pipe. Plural radial orifices extending from an exterior surface of the discharge the pipe first portion to an interior surface thereof. An intermediate portion of the discharge pipe is in fluid communication with the first portion and also has plural radial orifices extending from the exterior surface on the discharge pipe to the interior surface thereof. A second portion is at a downstream end of the discharge pipe and is in fluid communication with the discharge pipe intermediate portion. The second portion of the discharge pipe is configured to be selectively coupled to an exhaust conduit.

A pressure chamber is formed between the second flow channel and an exterior surface of the discharge pipe, the pressure chamber being in fluid communication with the interior of the discharge pipe via the plural radial orifices of the discharge pipe first portion and intermediate portion.

A fluid flow path thus can be formed between the charge conduit supplying compressed fluid (e.g., air), through the barrel valve, into the pressure chamber, and then into discharge pipe interior via the orifices. The orifices are axially angled to direct the compressed fluid away from the inlet guide pipe. The interior flow path of the discharge pipe is configured as a Venturi pipe, whereby fluid flowing therethrough is accelerated.

Thus, when the barrel valve is manipulated to allow the flow of compressed fluid into the discharge pipe, a vacuum is formed above the orifices. Air is drawn into the inlet guide pipe. When such air is flowing and the end of the aspirator is proximate a bundle of filaments, the filaments are drawn into the inlet guide pipe without tangling. The air flow is sufficient to maintain the ends of the filaments within the aspirator as the filaments are manipulated, with respect to further processing equipment. Once oriented as desired, the barrel valve is re-oriented to reduce or stop the flow of compressed fluid and the filaments are released from the aspirator.

The fluid metering valve employed in the presently disclosed aspirator is provided with a barrel valve having a passage that extends off-axis along a length of and through the barrel valve. When in a closed orientation, a solid portion of the barrel valve blocks the passage intermediate the two flow channels. Rotation of the barrel valve exposes a portion of the passage intermediate the two flow channels, allowing a metered amount of fluid flow therebetween. The off-axis passage and associated solid portion of the barrel valve enable the thickness of the distribution manifold receiving the valve to be minimized, thereby reducing the overall footprint and weight of the manifold.

Beneficially, the passage is formed with a square, rectangular, or rounded rectangular cross-section. Such a configuration enables a linear or near linear relationship between change in fluid flow volume through the passage and change in angular position of the barrel valve relative to the distribution manifold. This linearity provides a more predictable response to valve manipulation. In addition, such a configuration enables the valve to change from fully closed to fully open in less than one-hundred twenty degrees of barrel valve rotation and in another embodiment, ninety degrees or less, allowing for a faster rate of fluid flow increase or decrease.

A further advantage enabled by the presently disclosed fluid metering valve is that the volume of material in the barrel valve can be minimized, thereby contributing to weight and size reduction.

In an aspect of the present embodiments, a fluid metering valve assembly includes a barrel valve having a valve body, the body being substantially symmetrical about an axis of symmetry. The valve body has first and opposite second ends along the body axis of symmetry and a passage formed laterally through the body.

The passage comprises mutually parallel, planar, first and second side walls, each lying in a respective plane that is parallel to the body axis of symmetry. The passage also comprises a first planar end wall, intermediate ends of the first and second side walls most proximate the body first end, and a second planar end wall, intermediate ends of the first and second side walls most proximate the body second end. The first end wall is parallel to the second end wall and both the first and second end walls lie in a respective plane that is orthogonal to the body axis of symmetry.

The passage also comprises transition regions between the first planar end wall and the ends of each of the first and second side walls most proximate the body first end and between the second planar end wall and the ends of each of the first and second side walls most proximate the body second end. In an embodiment, the transition regions are each a right angle, whereby a cross-section of the passage coincident with the valve body axis of symmetry is a rectangle or square. In another embodiment, the transition regions are each a circular arc having a central angle of ninety degrees, whereby a cross-section of the passage coincident with the valve body axis of symmetry is a rounded rectangle or rounded square.

In another embodiment, a method of enabling the selective engagement of plural non-woven filaments using an aspirator is disclosed. The aspirator is as described above. The charge conduit is coupled to the first air flow channel, the inlet guide pipe is coupled to a second end to the discharge pipe first portion, and the exhaust conduit is coupled to the discharge pipe second portion. The barrel valve assembly is selectively rotated within the barrier wall to selectively place the first and second flow channels in mutual fluid communication, whereby pressurized fluid from the charge conduit flows through the first flow channel, through the barrel valve assembly, and into the pressure chamber. Pressurized fluid then flows through the plural radial orifices into the discharge pipe towards the downstream end thereof. A vacuum created above the Venturi tube formed by the discharge pipe interior intermediate the orifices enables attraction and retention of the filaments within the aspirator. Precise, linear control of the vacuum is achieved through use of the barrel valve assembly.

DETAILED DESCRIPTION OF EXEMPLARY EMBODIMENTS

Figure 1A:
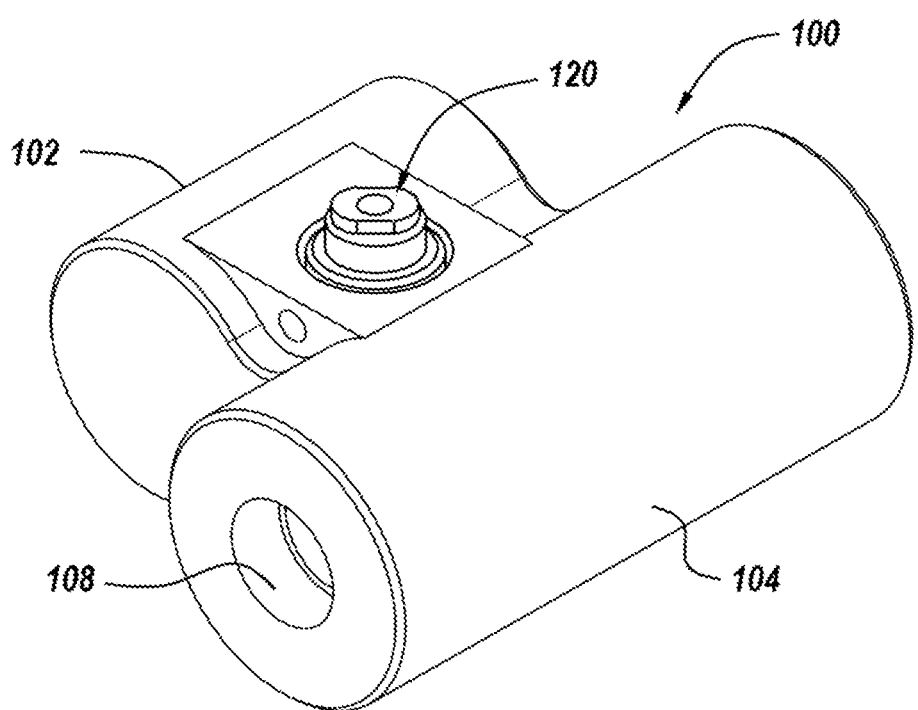
FIG. 1A is a perspective view of a distribution manifold having a valve assembly according to the present disclosure.
Figure 1B:
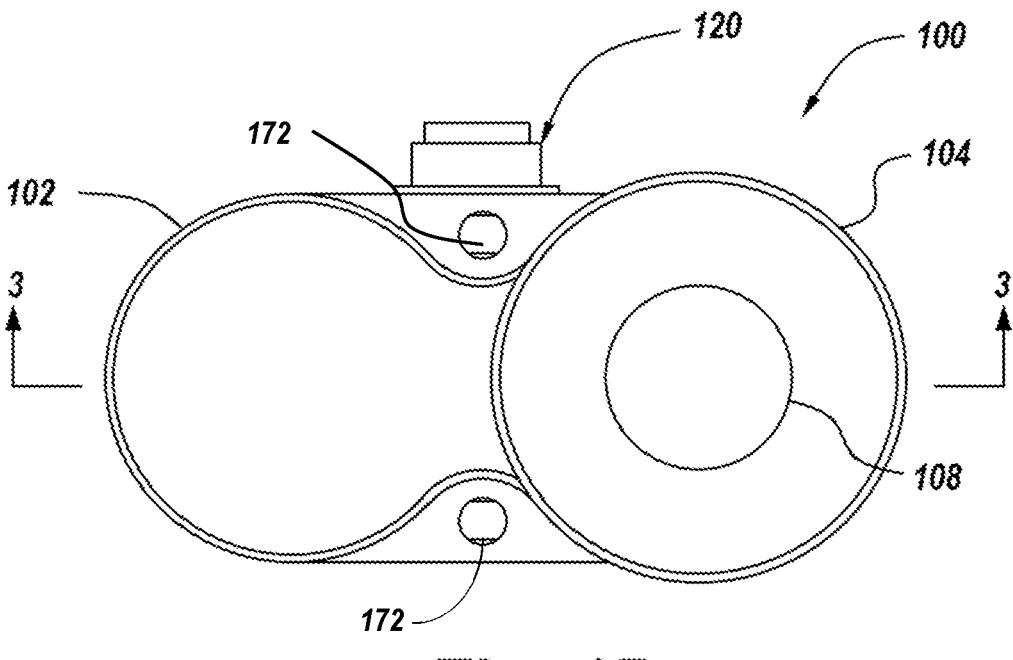
FIG. 1B is an elevation view of the distribution manifold of FIG. 1A.

FIGS. 1A and 1B show a particular embodiment of a distribution manifold 100 having a barrel valve assembly 120 disposed therein according to the present disclosure. The illustrated manifold includes first and second mutually parallel flow channels 102, 104, the flow channels being in selective mutual communication via the valve assembly. The manifold is also visible in a horizontal section views in FIGS. 3A and 3B.

In the illustrated embodiment, the first flow channel 102 terminates within the manifold, opposite an open end 106, while the second flow channel 104 has dual open ends 108, 110, though the presently disclosed valve assembly 120 is operable in association with other manifold embodiments as well. Each flow channel open end can be provided with suitable features to facilitate the selective coupling of fluid-conveying members, such as hoses, tubes or pipes, as will be discussed below with regard to an aspirator assembly of the present disclosure. These features can be, for example, mutually cooperating threads disposed on or in a manifold open end and on or in an end of the cooperating fluid-conveying member. Alternatively, mutually cooperating male and female quick connect fittings can be employed for purposes of selective coupling.

Figure 3A:
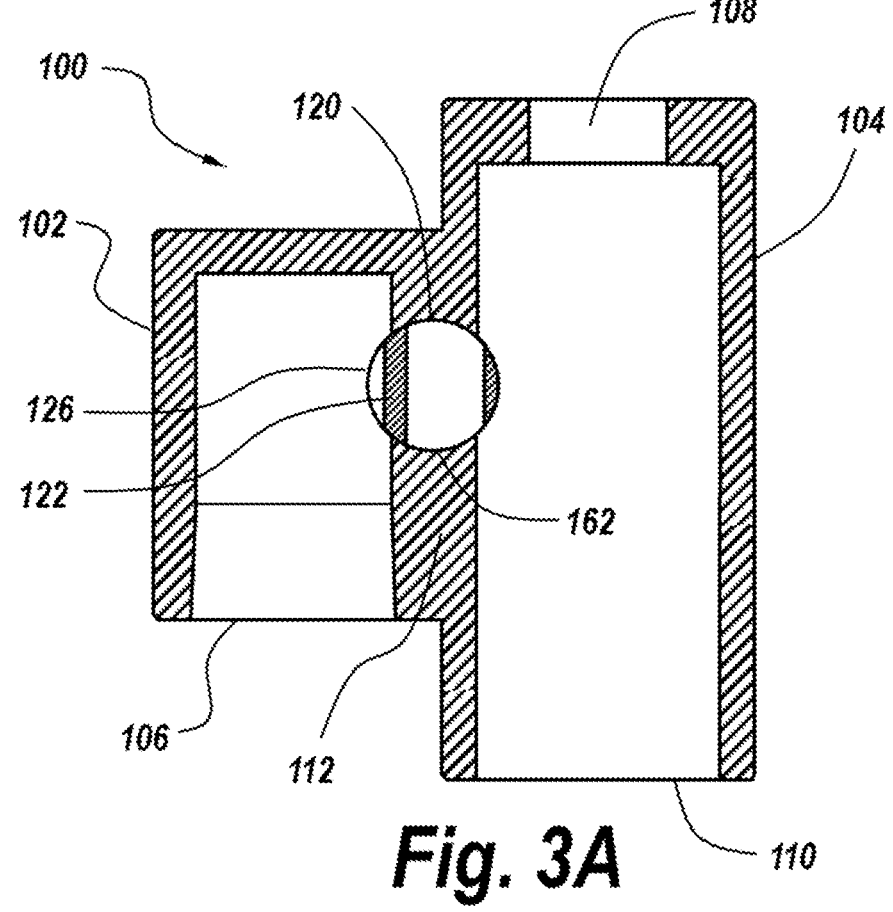
FIG. 3A is a top section view of the manifold of FIG. 1B taken along section lines 3-3 illustrating the barrel valve of FIGS. 2A and 2B in a closed orientation relative to the distribution manifold.
Figure 3B:
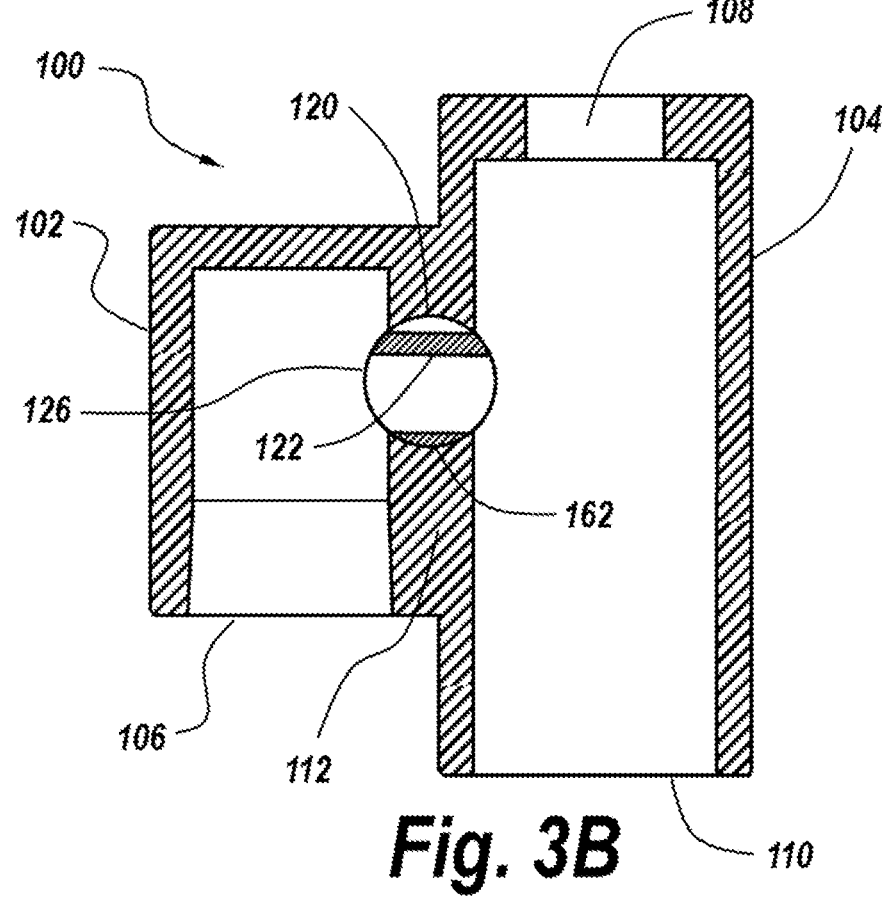
FIG. 3B is a top section view of the manifold of FIG. 1B taken along section lines 3-3 illustrating the barrel valve of FIGS. 2A and 2B in an open orientation relative to the distribution manifold.

As shown in FIGS. 3A and 3B, the substantially cylindrical valve assembly 120 is disposable in a semi-cylindrical bore 162 formed within a barrier wall 112 intermediate the first and second mutually parallel flow channels 102, 104. As illustrated in the exploded view of FIG. 4, the barrel valve assembly includes a barrel valve 122. In certain embodiments of the valve assembly, additional elements are included, such as one or more O-rings 124, also referred to as circular seals, and a liner 126, as discussed below.

Figures 2A, 2B:
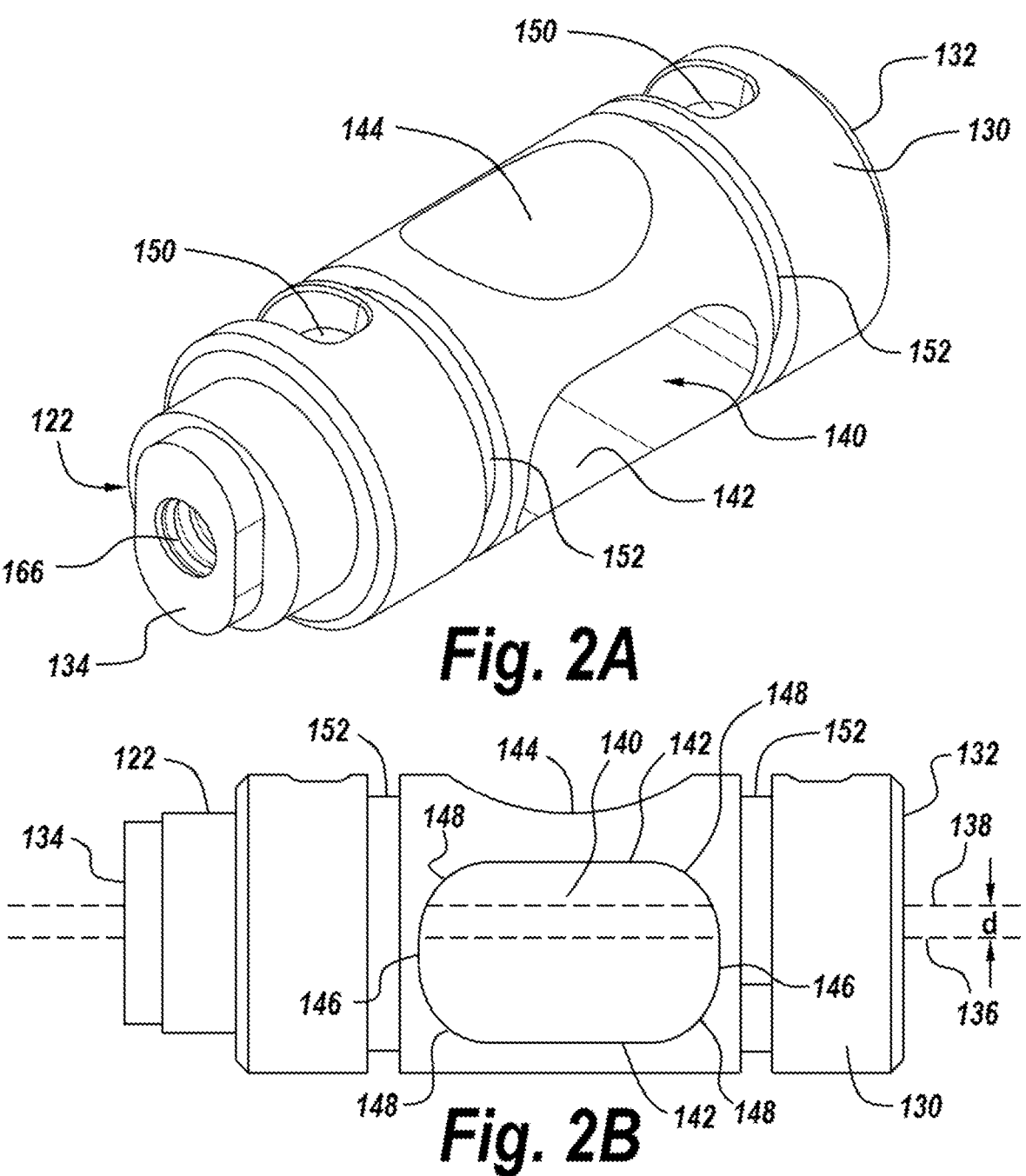
FIG. 2A is a perspective view of a barrel valve for use in the valve assembly of FIGS. 1A and 1B.
FIG. 2B is a side elevation view of the barrel valve of FIG. 2A.

The barrel valve 122 is depicted in detail in FIGS. 2A and 2B. The barrel valve has a substantially cylindrical body 130 having an axis of symmetry 138 and first and second opposite ends 132, 134. Intermediate the two ends, a passage 140 extends laterally across and through the body. The passage is comprised of two mutually parallel, planar side walls 142 and two mutually parallel, planar end walls 146. The side walls each lie in a plane that is parallel to the axis of symmetry. A first end wall is intermediate the ends of a first side wall and a second side wall that are most proximate the body first end, while a second end wall is intermediate the ends of the first side wall and the second side wall that are most proximate the body second end. The end walls each lie within a respective plane that is orthogonal to the body axis of symmetry. A plane 136 intermediate or halfway between the first and second side walls is parallel to but offset or spaced from the body axis of symmetry by a non-zero distance "d".

Transitions 148 extend between the first planar end wall 146 and the ends of the first and second side walls 142 most proximate the body first end 132 and between the second planar end wall and the ends of the first and second side walls most proximate the body second end 134. The body axis 138 of symmetry orthogonally intersects either both first and opposite second end walls of the passage or two opposing transitions.

As depicted, the passage 140 is a rounded rectangle in cross-sectional shape, as a result of each transition 148 being a circular arc having a central angle of ninety degrees. In alternative embodiments, the passage can present a rounded square. The term "rounded rectangle" is understood to encompass a rounded square. In yet further embodiments, each transition 148 is a right angle, whereby the passage is a rectangle or square. All embodiments have substantially linear side walls 142 and end walls 146 therebetween. These characteristics provide for a substantially linear response in adjustment of flow rate with respect to degree of barrel valve 122 rotation. A full range of flow control is thus enabled within 120 degrees of barrel valve 122 rotation, or within 90 degrees of barrel valve rotation.

The plane 136 intermediate the first and second side walls 142 being offset or spaced from the body axis of symmetry 138 places the passage 140 off axis relative to the axis of the valve body 130. This characteristic is useful in that a portion of the body can extend into one of the flow channels 102, 104, beyond its seal, while an opposite portion of the valve body extends across a semi-cylindrical bore 162 in the manifold barrier wall 112 (discussed subsequently), thereby preventing fluid flow therethrough. This orientation is depicted in FIG. 3A and results in an ability to utilize a thinner barrier wall between flow channels, thus reducing the overall footprint and weight of the distribution manifold.

Figure 4:
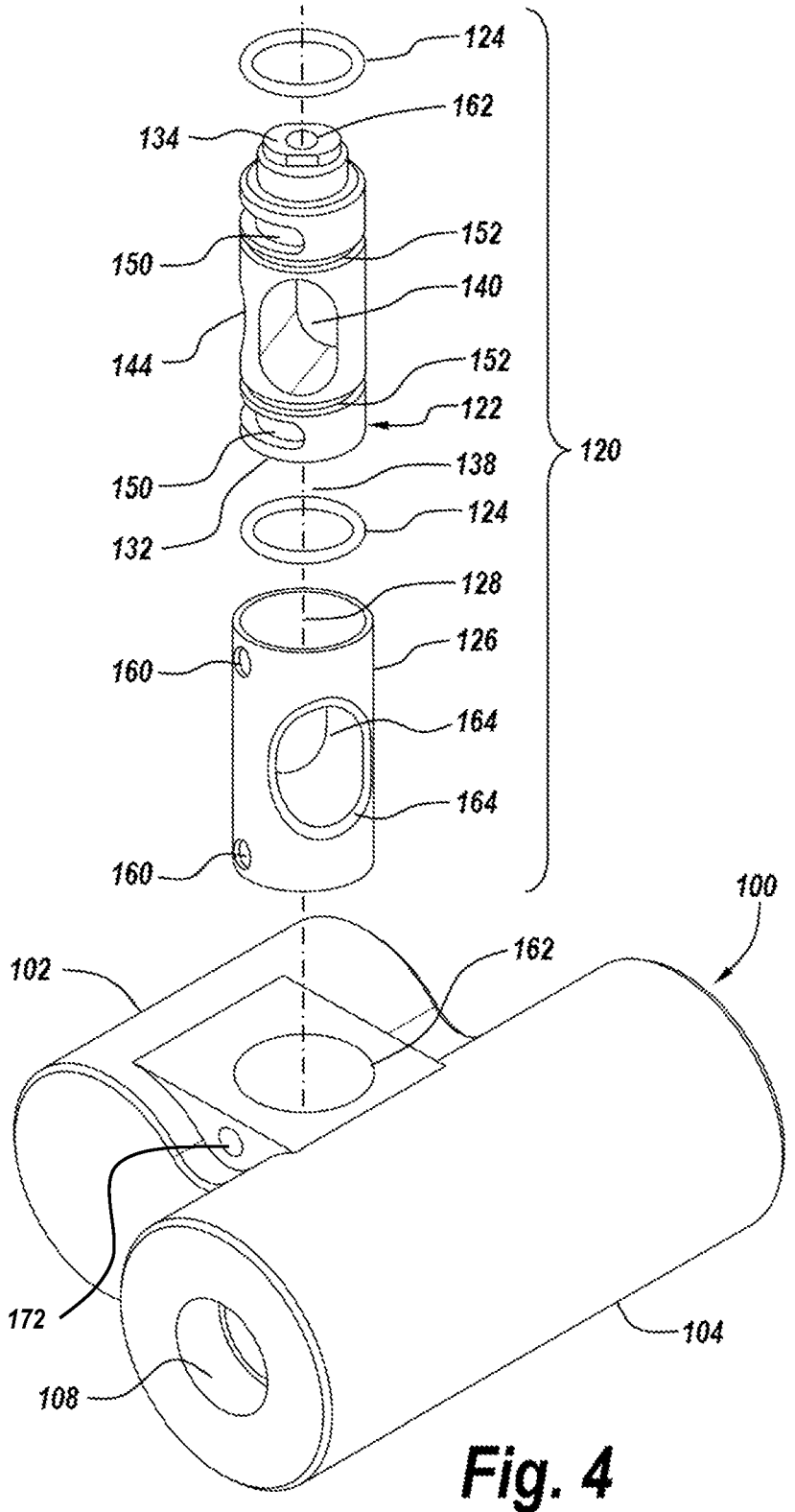
FIG. 4 is an exploded, perspective view of the distribution manifold of FIGS. 1A and 1B having a valve assembly, including the barrel valve of FIGS. 2A and 2B.

In an embodiment, the barrel valve 122 has at least one rotation limiting channel 150 formed on the body 130. In FIGS. 2A and 4, two such channels are provided, one proximate the body first end 132 and one proximate the body second end 134. These channels are each intended to receive and cooperate with a respective fixed projection 174 (FIG. 7), such as a set screw extending radially inward from ports 172 (FIGS. 4 and 7) of the distribution manifold 100 barrier wall 112. The projections can be threaded members having a screw-head formed on one end for selective insertion into the manifold 100. In this embodiment, the ports have complimentary threads in an interior surface thereof. Once each projection is inserted into the respective port and is extended into the respective rotation limiting channel, rotation of the barrel valve is thus limited by the radial distance that the rotation limiting channel or channels extend about the body. In one embodiment, the channel or channels extend in an arc of 120 degrees or less about the body axis of symmetry 138 on the outer surface of the body. In a further embodiment, the channel or channels extend in an arc of roughly ninety degrees or less.

In order to minimize weight and the quantity of material required to fabricate the valve assembly 120, the valve body 130 can be provided with a cutout 144 formed on an outer surface of the body. In the illustrated embodiment of FIGS. 2A and 2B, the cutout is formed as a semi-cylindrical depression opposite one of the side walls 142. The cutout, if provided in other embodiments, can be provided with a variety of shapes as long as the structural integrity of the valve body forming the passage is not sacrificed.

The barrel valve 122 as described in the foregoing can be disposed within a semi-cylindrical bore 162 extending into the barrier wall 112 intermediate the first and second flow channels 102, 104. A sealing effect between the barrel valve and the bore can be achieved from appropriate lapping, grinding, burnishing or other surface treatment of the respective parts. Such treatment can vary, depending upon the materials chosen, which itself can be influenced by the specific fluid flow application involved. Suitable materials can include stainless steel for the barrel valve, which can be burnished for a closer tolerance fit with respect to the bore. However, other materials can also be selected, including thermoplastics or composites, with or without coatings or platings as desired or required. Factors varying with the application can include sealing pressures, cost of manufacture, fluid compatibility and reactivity, and rotational force required to manipulate the barrel valve.

However, in other embodiments, the barrel valve assembly 120 is provided with additional elements, as follows. In such a further embodiment of the valve assembly 120, the valve body 130 is also provided with at least one seal-receiving circular groove 152. As shown in the embodiment illustrated in FIGS. 2A, 2B, and 4, two such grooves are provided, one on either side of the passage 140. The grooves are mutually parallel and are configured to receive O-rings or circular seals 124 therein. This embodiment of the valve assembly, comprising a barrel valve 122 and O-rings, can be installed directly into the semi-cylindrical bore 162 in the barrier wall 112, the O-rings bearing against the bore walls as the valve assembly is selectively rotated about its axis of symmetry 138.

In yet a further embodiment, the barrel valve assembly 120 further comprises, in addition to a barrel valve 122 and O-rings 124, a liner 126 comprised of a substantially cylindrical shell with a respective axis of symmetry 128. The liner is intended for stationary installation into the bore 162 in the barrier wall 112. An inner diameter of the liner is selected to receive the barrel valve therein with an outer peripheral extent of the O-rings 124 configured for physical engagement with the inner surface of the liner, the O-rings sliding against the inner surface of the liner when the barrel valve 122 is rotated. A pair of mutually opposite apertures 164 are provided through the liner. When the barrel valve is disposed within the liner, the body can be rotated about its axis of symmetry 138, coincident with the axis of symmetry of the liner, such that the valve body passage 140 can be aligned with the mutually opposite liner apertures, when the valve assembly is in an open orientation, out of alignment with the mutually opposite liner apertures, when the valve assembly is in a closed orientation, or at some rotational orientation, such that a portion of the valve body passage is exposed within the mutually opposite liner apertures.

The liner 126 can be provided with one or more orifices 160. When the barrel valve 122 is installed within the liner, each of the at least one rotation limiting channels 150 formed on the body 130 is beneath a corresponding liner orifice. In this manner, a fixed projection 174, such as a set screw extending radially inward through a respective port 172 in the distribution manifold 100 barrier wall 112 can extend through each liner orifice and into the corresponding and underlying rotation limiting channel. In addition to limiting the degree of rotation of the barrel valve assembly about the respective axis of symmetry, the projections, extending into the rotation limiting channels, serve to maintain the lateral position of the barrel valve assembly within the distribution manifold 100.

The liner 126 can be provided of a variety of materials, including glass reinforced PTFE, brass, bronze, nylon, and acetal variants, with or without O-rings which, if used, can be made of Buna N. The sealing liner can also be provided of stainless steel, which can be burnished, for use with or without O-rings intermediate the liner and barrel valve 122.

Further still, an embodiment of the barrel valve assembly 120 comprises the barrel valve 122 and liner 126, without O-rings 124.

As best seen in FIG. 2A, the barrel valve 122 second end 134 is provided with a bore 166 formed therein. The bore can be provided with physical features for selectively engaging a handle member 170 (FIGS. 5 and 7) that can be manually rotated about the valve body 130 axis of symmetry 138, thereby rotating the barrel valve relative to the distribution manifold 100. A fastening member 176, such as a threaded screw, can be employed to removably affix the handle member to the barrel valve. For example, the bore can be provided with internal spiral threads. The rotation member is then provided with a cylindrical projection having complimentary spiral threads for engagement within the bore. Either or both barrel valve ends can have such physical features for selective engagement with a rotation member.

Also disclosed is a method of selectively interconnecting mutually adjacent flow channels 102, 104 in a distribution manifold 100 using a fluid metering valve assembly 120 including the barrel valve 122 described above, with or without the O-rings 124 and/or liner 126. The method includes providing a barrier wall 112 intermediate and separating first and second flow channels, forming a semi-cylindrical bore 162 within the barrier wall thereby forming an aperture intermediate the two flow channels, and disposing a barrel valve, such as described in the foregoing into the bore. The barrel valve can then be selectively rotated within the bore to align the passage 140 relative to the first and second flow channels. The two flow channels can thus be in varying degrees of fluid communication via the valve body 130 passage or can be mutually isolated by the valve body, depending upon the rotational orientation of the barrel valve within the bore.

The method can be practiced utilizing the barrel valve 122 alone within the barrier wall 112 bore 162, or can be practiced with a valve assembly 120 including the barrel valve and at least one O-ring 124 disposed within a respective circular groove 152. Further, the method can further be practiced with a valve assembly including the foregoing elements, along with the substantially cylindrical liner 126 as described above. In all embodiments, rotation of the barrel valve relative to the barrier wall bore results in a selective amount of fluid communication between the first and second flow channels 102, 104 via the passage 140, or no fluid communication at all.

Figure 5:
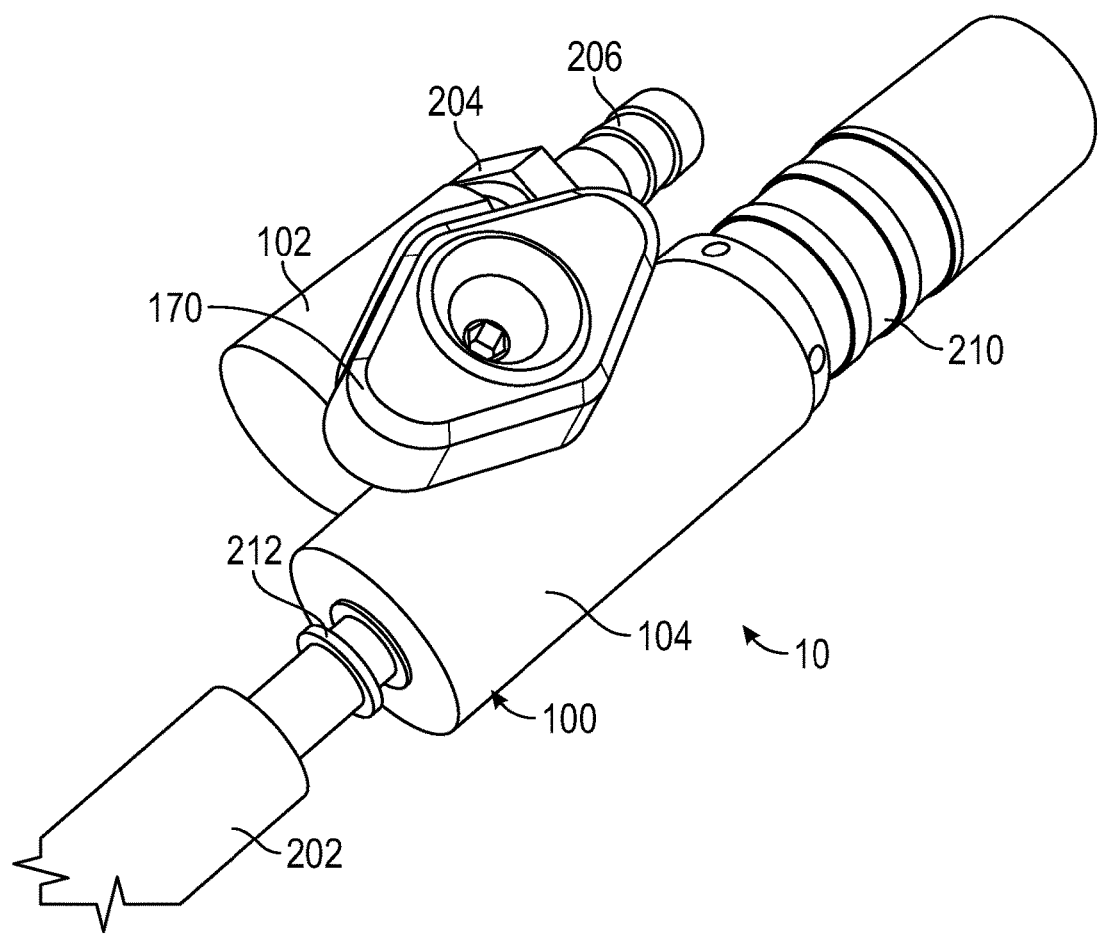
FIG. 5 is a perspective view of a portion of an aspirator assembly including the distribution manifold of FIGS. 1A and 1B and the barrel valve of FIGS. 2A and 2B.

The distribution manifold 100, including the barrel valve assembly 120, can be employed within an aspirator assembly 10, as presently disclosed. In FIG. 5, the first and second flow channels 102, 104 of the valve assembly are illustrated. Projecting from the first flow channel is a charge conduit interface 204. In one embodiment, the charge conduit interface is provided with spiral-wound threads on an external surface thereof and the first flow channel is provided with complimentary spiral-wound threads on an interior surface thereof. The charge conduit interface can thus be screwed into the open end 106 of the first flow channel. The opposite end of the charge conduit interface, in the illustrated embodiment of FIG. 5, is provided with circumferential ribs 206. The ribs are inclined in a direction towards the manifold when the charge conduit interface is installed into the manifold, thereby facilitating the attachment of a pliant charge conduit supplying compressed fluid, such as air. The charge conduit can be provided of, for example, natural or artificial elastomer and can have an internal diameter that is selected, such that the charge conduit stretches over the ribs, thereby retaining the conduit in position when compressed fluid is introduced therethrough.

Figure 7:
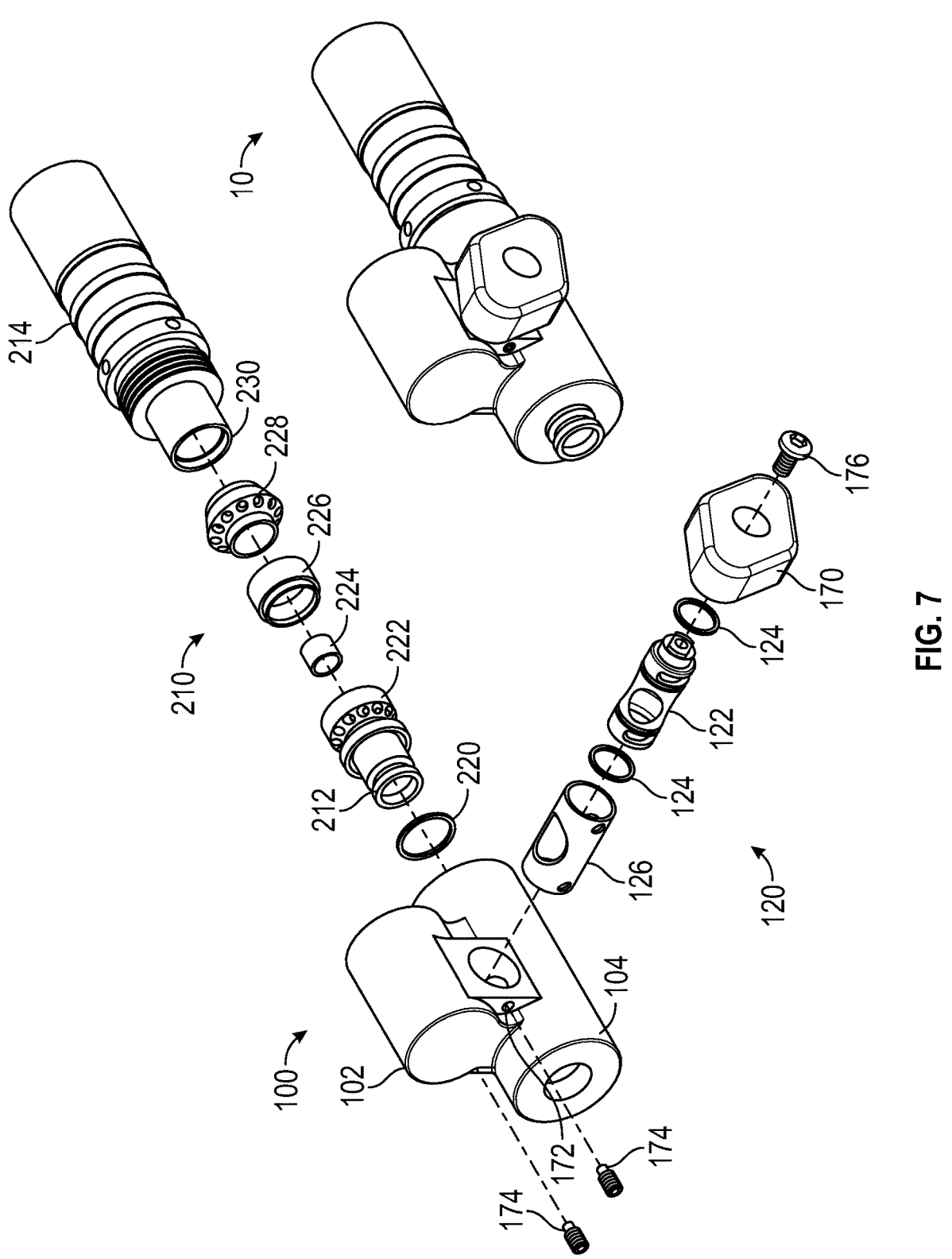
FIG. 7 are exploded and unexploded perspective views of a portion of the aspirator assembly of FIGS. 5 and 6.

As described in the foregoing, the barrel valve assembly 120 is disposed intermediate the first and second flow channels 102, 104, within a semi-cylindrical bore 162 within the barrier wall 112. As shown in FIGS. 5 and 7, a handle 170 is affixed to one end of the barrel valve assembly via a threaded fastener, such as a screw 176. The handle enables manual control over the rotational position of the barrel valve cylindrical body 130 relative to the first and second flow channels. Precise, linear, manual control over the flow of compressed fluid between the flow channels is thus enabled.

Also visible in FIG. 5 is a proximal portion of an inlet guide pipe 202. In one embodiment, the guide pipe is a cylindrical or substantially cylindrical hollow member having a cylindrical fluid flow channel therethrough that is substantially constant in cross-section from the distal inlet end to the proximal outlet end. The distal inlet end is intended to receive extruded filaments therein, as will be described below. The diameter of the inlet guide pipe is selected taking into consideration physical characteristics of the filaments and the number to be received at one time. The presently disclosed aspirator can be used with a variety of filaments, including solid and semi-solid fibrous materials.

Figure 6:
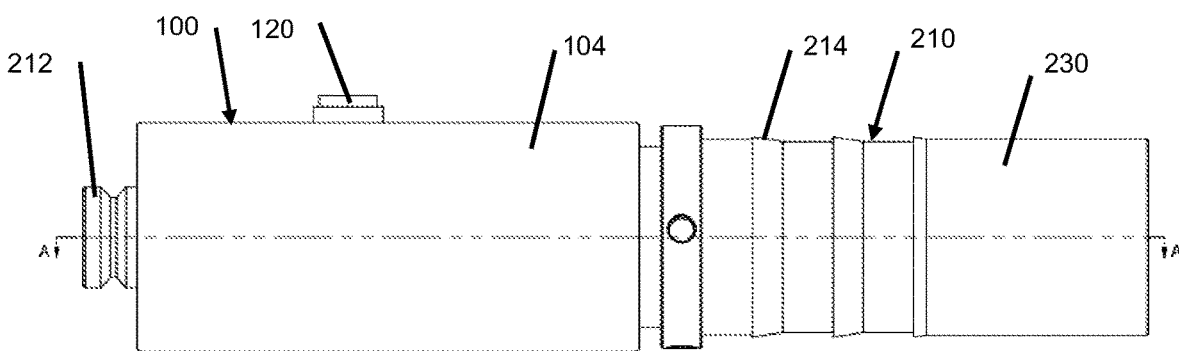
FIG. 6 is a bottom view of a portion of the aspirator assembly of FIG. 5.

The proximal end of the inlet guide pipe 202 is in mechanical and fluid-tight communication with a coupling surface 212 a first portion 222 of a discharge pipe 210 that extends through the second channel 104 of the manifold 100. As seen in FIG. 6, the discharge pipe 210, once installed within the second channel, extends from both ends of the manifold 100. At an upstream end, the first portion projects free of the manifold for selective coupling with the inlet guide pipe 202. At a downstream end thereof, a second portion 230 extends for selective coupling with an exhaust conduit (not shown). The second end is provided with circumferential ribs 214. The ribs are inclined in a direction towards the manifold when the discharge pipe is installed into the manifold, thereby facilitating the attachment of a pliant exhaust conduit receiving compressed fluid, such as air. The exhaust conduit can be provided of, for example, natural or artificial elastomer and can have an internal diameter that is selected, such that the exhaust conduit stretches over the ribs, thereby retaining the exhaust conduit in position when compressed fluid is received therethrough.

The discharge pipe 210 is also shown installed within the manifold 100 in FIG. 7 with upstream and downstream ends extending on opposite ends of the second flow channel 104. In the exploded portion of FIG. 7, the components comprising the discharge pipe are visible. Specifically, the discharge pipe comprises the first portion 222, an intermediate portion 228, and the second portion 230. Interior channels of these portions are co-aligned once assembled, as visible in FIG. 8. The discharge pipe also includes one or more additional flow channel shaping and constricting sections 224, 226 between the first portion and the intermediate portion 228. The discharge pipe can also include an O-ring 220 or similar sealing member on the upstream end of the first portion to form a fluid-tight connection between the first portion and the upstream opening of the second channel.

Also visible in the exploded view of FIG. 7 are elements of the barrel valve assembly 120, including the barrel valve 122, liner 126, O-rings 124, handle 170 and threaded member 176. Fixed projections 174, such as sets screws, are also shown for insertion into the manifold for limiting the barrel valve rotation, as discussed above.

Figure 8:
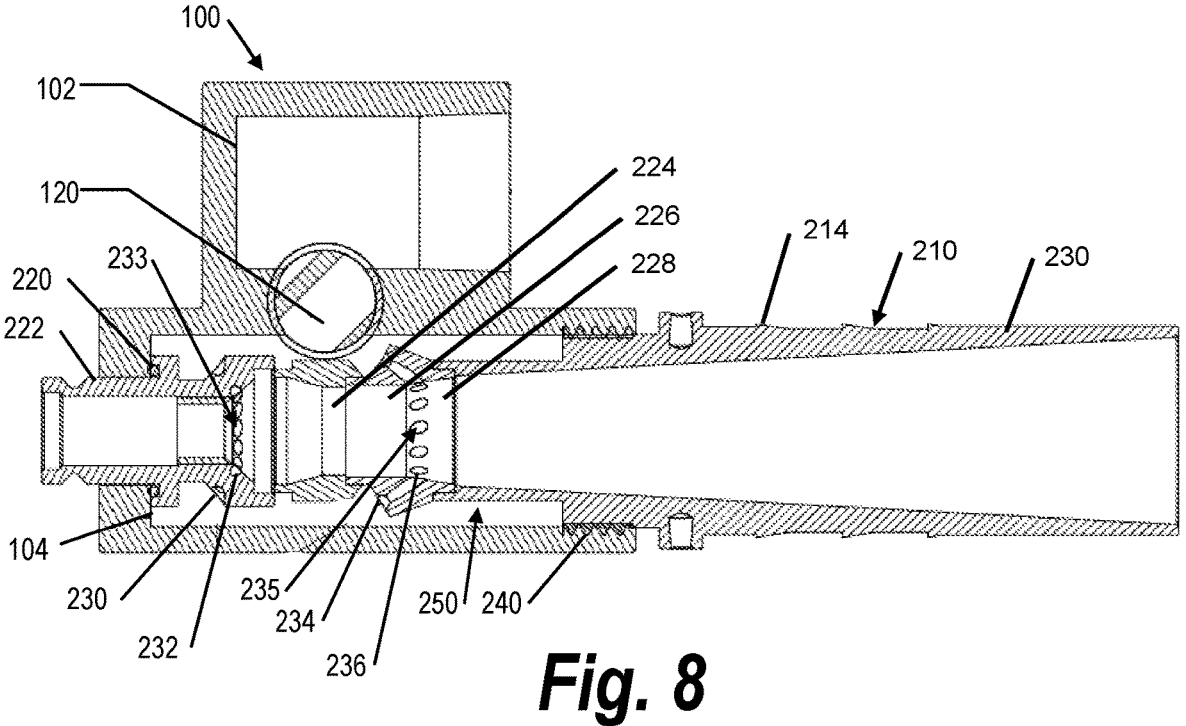
FIG. 8 is a side section view of the aspirator assembly portion of FIG. 7.

The exploded portions of the discharge pipe 210 are shown assembled and installed within the manifold 100 in FIG. 8. Also shown is the barrel valve assembly 120. The O-ring 220 provides a fluid-tight seal between a forward face of the first portion 222 and an interior surface of the second channel 104. Threads 240 formed on the exterior surface of the discharge pipe second portion 230 and on the interior surface of the second channel 104 also enable a fluid-tight seal. A pressure chamber 250 is thus formed in the space between the discharge pipe exterior surface and the second channel interior surface. The barrel valve assembly 120 selectively places a stream of pressurized fluid from the charge conduit in communication with the pressure chamber, depending upon the rotational position of the valve about its axis of symmetry.

When the barrel valve assembly 120 is rotated, such as through manual manipulation of the handle 170, compressed air from the charge conduit interface 204 enters the pressure chamber 250. The discharge pipe first and intermediate portions 222, 228 each have a series of radially distributed, axially inclined orifices 233, 235 evenly distributed about the surface thereof. These orifices act as fluid pathways between the pressure chamber and the interior of the discharge pipe. Compressed air thus enters each orifice at a respective entrance 230, 234 within the pressure chamber and exits the orifice at a respective exit 232, 236 within the discharge pipe interior. In one embodiment, the entrances are disposed upstream of the respective exits and are axially aligned, such that each orifice enables a jet of compressed air parallel to an axis of symmetry of the discharge pipe to enter the discharge pipe interior.

The interior diameter of the discharge pipe between the first portion 222 and the intermediate portion 238, defined by at least one of the additional flow channel shaping and constricting sections 224, 226, is narrower than the diameter within the first portion and within the inlet guide pipe 202, on the upstream side, and narrower than the discharge pipe second portion 230, on the downstream side. In one embodiment, one or both of the additional flow channel shaping and constricting sections is manufactured of a hardened material, such as steel. As these portions are typically contacted by polymer fibers in use, they present a wear resistant surface. Other portions of the discharge pipe that are not typically contacted by polymer filaments are made from lighter-weight materials, such as aluminum.

The orifices thus form a Venturi tube through the narrow diameter flow shaping and constricting sections 224, 226, accelerating the flow of air coming from the inlet guide pipe. This flow of air can thus be employed to form a vacuum in the inlet guide pipe and to draw a bundle of filaments into the inlet guide pipe and at least a portion of the discharge pipe. The filaments can go all the way through the aspirator and can be exhausted via a hose, perforated bag, or the like, which can be attached to a discharge nipple. The air flow caused by the Venturi tube exerts sufficient drag on the filaments, such that the aspirator assembly 10 can be manually manipulated to physically relocate the bundle.

Figure 9:
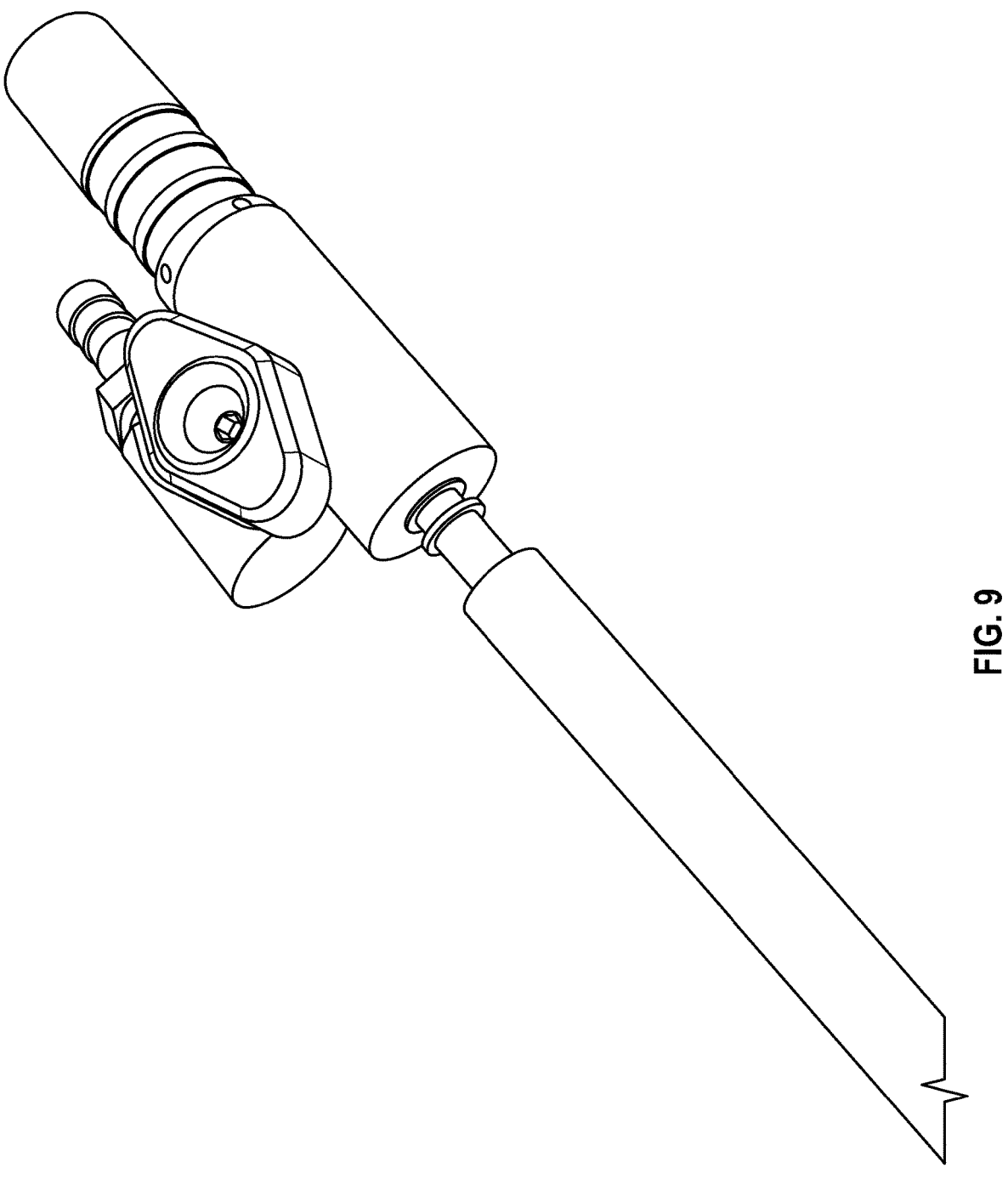
FIG. 9 is a photo of the aspirator assembly.
Figure 10:
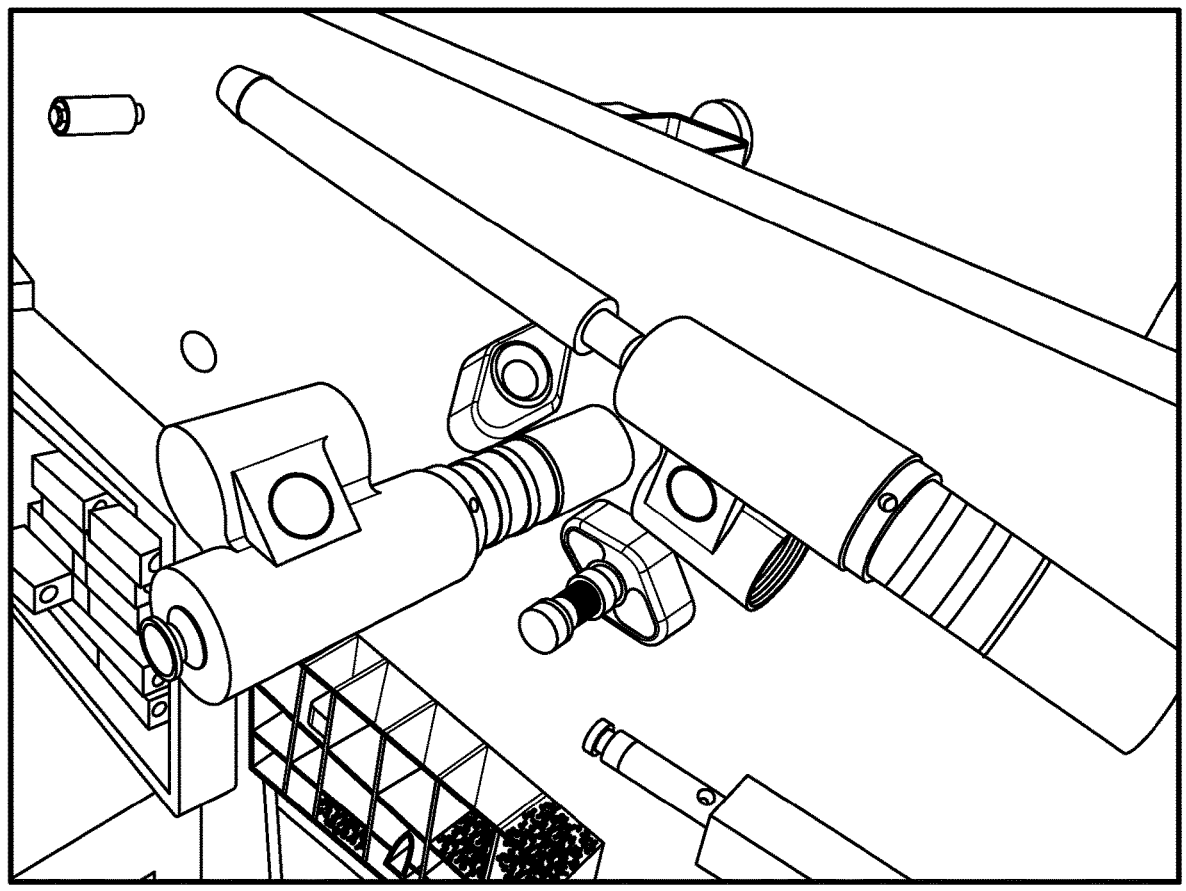
FIG. 10 is a photo of the disassembled aspirator assembly.

For example, the bundle of filaments, having been extruded through spinnerets, can be acquired by the inlet guide pipe of the aspirator assembly 10, photo of the aspirator assembly shown in FIG. 9, then brought into contact with Godet rollers or other extrusion or winding equipment. A photo of the disassembled aspirator is shown in FIG. 10.

A method of use of such an aspirator assembly 10, also referred to as an aspirator gun, includes assembling a barrel valve assembly 120 as disclosed herein and disposing it into a semi-cylindrical bore within the barrier wall 112 of a distribution manifold 100. The barrel valve can then be manually manipulated to control the flow of compressed fluid (e.g., air) from a charge conduit, through a charge conduit interface 204 disposed within a first flow channel 102 in the manifold, through the barrel valve, and into a pressure chamber 250 formed between the interior of a second flow channel 104 in the manifold and the exterior of a discharge pipe 210 located within the second flow channel. An inlet guide pipe 202 is affixed to an upstream end of the discharge pipe. As the barrel valve is rotated about its axis, pressurized fluid flows therethrough, into the pressure chamber, and into the discharge pipe via plural radially arranged orifices 233, 235 connecting the pressure chamber to the interior of the discharge pipe. The cross-sectional configuration of the discharge pipe includes a narrow portion intermediate upstream and downstream sets of orifices. A Venturi is thus formed, drawing air into the open end of the inlet guide pipe. A free end of filaments can thus be drawn into the aspirator assembly and selectively retained therein for manual manipulation of the filament bundle.

Alternative embodiments of the subject matter of this application will become apparent to one of ordinary skill in the art to which the present invention pertains, without departing from its spirit and scope. It is to be understood that no limitation with respect to specific embodiments shown here is intended or inferred.

What is claimed is:

1. A barrel valve assembly comprising:
   a valve body being substantially symmetrical about an axis of symmetry;
   first and opposite second ends along the valve body axis of symmetry; and
   a passage formed laterally through the valve body, the passage comprising:
   mutually parallel, planar first and second side walls, each lying in respective plane that is parallel to the axis of symmetry of the valve body,
   a first planar end wall, intermediate ends of the first and second side walls most proximate the valve body first end,
   a second planar end wall, intermediate ends of the first and second side walls most proximate the valve body second end, the first end wall being parallel to the second end wall and both the first and second end walls lying in a respective plane that is orthogonal to the valve body axis of symmetry, and
   transition regions between the first planar end wall and the ends of each of the first and second side walls most proximate the valve body first end and between the second planar end wall and the ends of each of the first and second side walls most proximate the valve body second end,
   wherein a plane equidistant to each of the first and second side walls is parallel to, but offset from, the valve body axis of symmetry.

2. The barrel valve assembly of claim 1, wherein the transition regions are each a right angle, and whereby a cross-section of the passage coincident with the valve body axis of symmetry is a rectangle or square.

3. The barrel valve assembly of claim 1, wherein the transition regions are each a circular arc having a central angle of ninety degrees, whereby a cross-section of the passage coincident with the valve body axis of symmetry is a rounded rectangle or rounded square.

4. The barrel valve assembly of claim 1, wherein the valve body has at least one rotation limiting channel formed on an outer surface thereof, the at least one rotation limiting channel lies in a plane orthogonal to the valve body axis of symmetry and in an arc of one-hundred twenty degrees or less about the valve body axis of symmetry on the outer surface of the valve body.

5. The barrel valve assembly of claim 1, further comprising a substantially cylindrical liner having an axis of symmetry and an inner diameter selected to receive the valve body therein and having a pair of mutually opposite apertures that can be fully, partially, or not aligned with the valve body passage when the valve body is received within the liner and the valve body is rotated about the valve body axis of symmetry, wherein the valve body axis of symmetry and the liner axis of symmetry are coaxial when the valve body is received within the liner.

6. The barrel valve assembly of claim 5, wherein the liner comprises glass reinforced polytetrafluoroethylene (PTFE), brass, bronze, nylon, acetal thermoplastics, or stainless steel.

7. The barrel valve assembly of claim 5, wherein the liner comprises one or more orifices.

8. The barrel valve assembly of claim 1, further comprising a presence of O-rings or an absence of O-rings associate with the valve body.

9. The barrel valve assembly of claim 1, wherein at least one of the valve body first and opposite second ends has at least one bore formed therein, and the at least one bore has an internal, spiral thread for selectively receiving a cylindrical projection of a member therein, the cylindrical projection having an external spiral thread formed thereon, the member being for selectively adjusting the rotational position of the valve body about the valve body axis of symmetry.

10. The barrel valve assembly of claim 1, wherein the valve body has a cutout formed on an outer surface of the valve body.

11. The barrel valve assembly of claim 10, wherein the cutout formed on an outer surface of the valve body is a semi-cylindrical depression opposite one of the side walls.

12. The barrel valve assembly of claim 1, further comprising at least one seal-receiving circular groove.

13. The barrel valve assembly of claim 3, wherein two seal-receiving circular grooves are provided, wherein one of the is two seal-receiving circular grooves is located on each side of the passage, and wherein the two seal-receiving circular grooves are configured to receive O-rings or circular seals therein.

14. The barrel valve assembly of claim 1, wherein the planar first and second side walls and the first and second planar end walls are substantially linear.

15. The barrel valve assembly of claim 1, comprising stainless steel or thermoplastics.

16. The barrel valve assembly of claim 1, further comprising a bore for a fastener located at the second end for selectively engaging a handle for manual rotation of the barrel valve.

17. An air distribution manifold comprising:
a first flow channel;
a second flow channel adjacent to the first flow channel;
a barrier wall in between the first flow channel and the second flow channel; and
the barrel valve assembly of claim 1 located within the barrier wall,
wherein the first flow channel and the second flow channel are in selective mutual communication via the barrel valve assembly.

18. The air distribution manifold of claim 17, wherein the first flow channel is configured to be selectively coupled to a charge conduit providing pressurized fluid to the first flow channel,
wherein the second flow channel is configured to be selectively coupled to a discharge pipe.

19. The air distribution manifold of claim 17, wherein a solid portion of the barrel valve blocks a passage intermediate the first flow channel and the second flow channel when the barrel valve is in a closed position and where an open passage exists intermediate the first flow channel and the second flow channel when the barrel valve is in an open position allowing a metered amount of fluid therebetween.

* * * * *